April 14, 1931.  G. A. MITCHELL  1,800,225
VIEW FINDER MOUNTING FOR CAMERAS
Filed Nov. 13, 1928
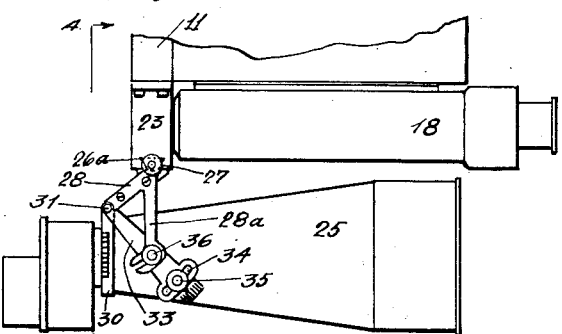
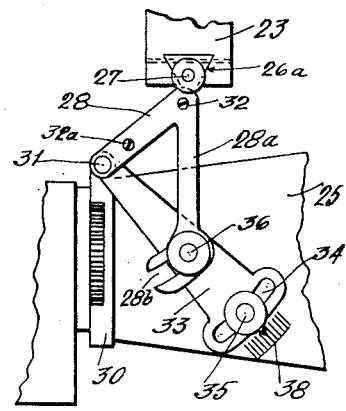
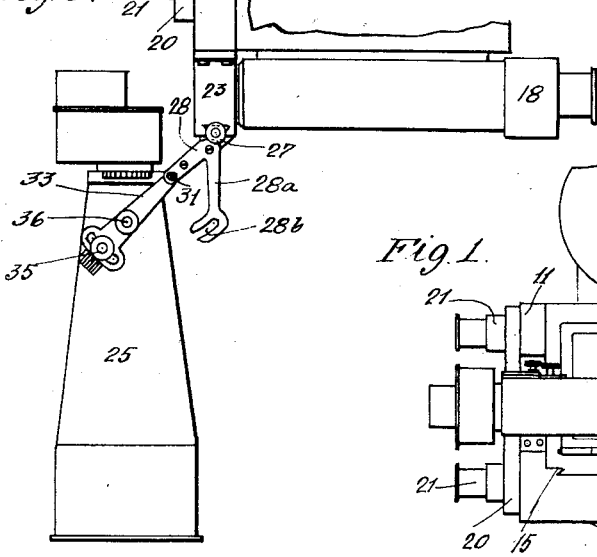
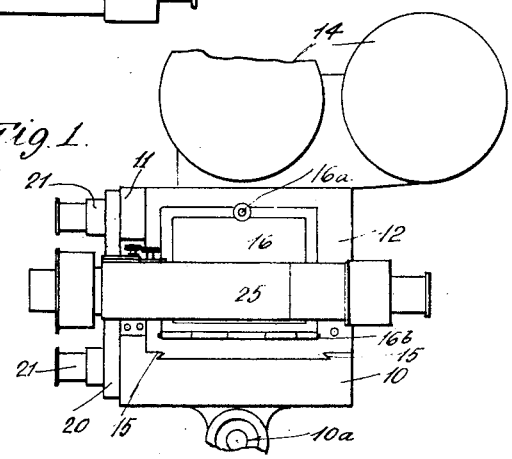
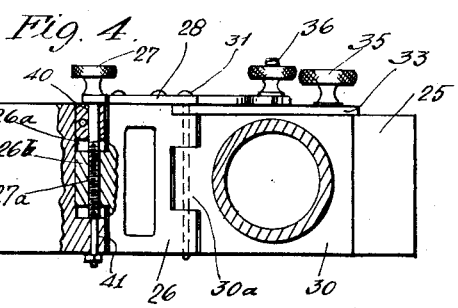
Inventor.
George A. Mitchell
Attorney.

Patented Apr. 14, 1931

1,800,225

UNITED STATES PATENT OFFICE

GEORGE A. MITCHELL, OF LOS ANGELES, CALIFORNIA, ASSIGNOR TO MITCHELL CAMERA CORPORATION, A CORPORATION OF DELAWARE

VIEW-FINDER MOUNTING FOR CAMERAS

Application filed November 13, 1928. Serial No. 319,107.

The present invention has to do generally with viewing devices for cameras or the like, and more particularly with an adjustable mounting for such devices.

The invention has certain general characteristics similar to the device comprising the subject matter of a patent entitled "Viewing devices for cameras," No. 1,646,829, issued to me on October 25, 1927, but embodies certain improvements over the referred device. It is a general purpose of the invention to provide a mounting for a view finding device, whereby the device may be accurately adjusted to the objective of a camera lens, and to include also in the mounting, means whereby the viewing device, if for any reason it is moved out of its adjusted operating position, may easily be returned to its previously adjusted operative position without the necessity of further adjustment or readjustment.

Numerous features and advantages of the invention will be most clearly and readily understood from the following detailed description, throughout which reference is made to the accompanying drawings, in which:

Fig. 1 is a side elevation of a camera including the viewing device in operative position;

Fig. 2 is an enlarged fragmentary plan view of the device and its mounting in the position of Fig. 1;

Fig. 3 is a view similar to Fig. 2 but showing the viewing device in changed or inoperative position;

Fig. 4 is an end view on line 4—4 of Fig. 2; and

Fig. 5 is an enlarged detailed view of the viewing device mounting in the position of Fig. 2.

Although I have shown and will describe the invention as applied to a particular type of camera, it will be understood that the utility of the device is not restricted to this one form of camera, and that it may be considered as applicable to motion picture and other cameras in general.

Referring particularly to Fig. 1, the illustrated type of camera is seen to embody a base 10 mounted at 10a on a camera support (not shown) and a head 11 stationary on the base and extending upward at its front end. A camera box or housing 12 is mounted on base 10 back of the head 11, the housing containing, among other parts, the aperture plate, film gate and intermittent movement mechanism for controlling the film, these parts being within the housing and therefore are not shown. Mounted on top the housing are the film magazines 14. The housing 1 in the particular type of camera here described, is slidably mounted on the base 10 by means of tongue and groove ways 15 in order that, and for reasons that will later appear, the housing may be moved laterally behind the photographic objectives. Access to the interior of the housing is had through door 16, hinged thereon at 16b and having a fastening device 16a.

A focusing tube 18 is mounted on door 16 of the housing, and extends along the side of the housing to terminate back of the camera head 11, or, in the position of Fig. 3, back of bracket 23, the latter serving to support the viewing device as will later be seen. A photographic lens turret 20 is mounted on the front side of head 11 and carries a plurality of mountings 21 containing the photographic lenses. The photographic lenses each are adapted to be brought into position before the aperture plate, which position is in horizontal alinement with the focusing tube 18, as shown in Fig. 3. Then the body may be moved horizontally, as described, to bring the focusing tube into registration with the selected photographic lens for fine focusing. In the normal position of the parts, as shown in Fig. 2, the photographic lens is, of course, in register with the aperture plate of the camera, and the focusing tube is moved relatively to one side behind the bracket 23.

A viewing device 25 is provided in order that after the photographic lens has been focused upon a scene, this device may be brought to focus upon the field of the photographic lens, the viewing device being constructed in a manner such that the scene as viewed therethrough, represents the extent to which it appears on the film behind the photographic lens. In order to bring the viewing device into exact focus and alinement with the field of the photographic lens, the usual procedure followed is to aline a cross hair in the photographic lens mounted or focusing tube with some particular object in the scene to be photographed, after which the viewing device is alined and focused by bringing its cross hair adjustment into alinement with the object previously alined with the cross hair of the photographic lens. Due to the fact that scenes are at times photographed at some distance from the camera, it is evident that under such conditions, adjustment of the viewing device should be, and is, of considerable accuracy. The viewing device must, in other words, be adjusted to the angle of parallax, which in some cases may be very small. And, having been once adjusted, my mounting maintains that adjustment; and even though the view finder has to be moved out of the way for any reason, it is not necessary to readjust the setting to bring the view finder back to its exact and previously adjusted position.

As indicated in Fig. 4 an adjustable bracket 26 is fitted into the stationary bracket 23 by means of a vertical dove-tail way 26a, bracket 26 being vertically adjustable by means of adjustment screw 27 journaled at 40 and 41 in the stationary bracket and having a central portion 27a threaded through boss 26b of bracket 26, boss 26b being movable vertically between journals 40 and 41. These provisions allow vertical adjustment of the viewing device to aline it as regards elevation with the photographic lens.

The adjustable bracket 26 is shaped to provide a yoke for receiving a boss 30a on the head plate 30 of the viewing device, a pivot pin 31 extending downwardly through the yoke and head plate boss. A pair of integrally formed arms 28 and 28a are attached to bracket 26 at 32 and 32a and also at the pivot pin 31. An adjustment arm 33 is provided at one end on the pin 31 and is provided at its other end with an arcuate slot 34 through which extends an adjustable screw 35 mounted on top of the viewing device. A screw stop 36 is mounted on arm 33 intermediate its ends and in such position as to register with open ended slot 28b in the outer end of arm 28a when arm 33 is rotated from the position of Fig. 3 to that of Fig. 2.

Assuming that it is desired to focus and aline the viewing device upon the field of the photographic objective lens 21, the front lens of the viewing device may be brought into horizontal alinement with lens 21, in the position shown in Fig. 4, by adjusting bracket 26 by means of screw 27 as described. The device then may be adjusted in a horizontal plane by first turning about the pivot 31 until stop screw 36 is in its limiting position in slot 28b, and then clamping arm 33 in position by tightening the stop screw. The view finder is then turned about pivot 31, arm 33 remaining stationary, until it is brought to the desired position, after which screw 35 is tightened, thereby securing the viewing device in adjusted position. The particular position of the adjustment arm with respect to the device may be noted by means of an indicator scale 38.

When it is desired to gain access to the interior of the camera housing 12 through door 16, stop screw 36 is loosened and the viewing device swung about pivot 31 from the position of Fig. 2 to the that of Fig. 3, the position of arm 33 with respect to the viewing device remaining unchanged. The viewing device may then be returned to its operative position and exactly into its previous position of adjustment, by swinging the device until stop screw 36 has reached its limiting position in slots 28b, after which screw 36 is tightened.

It will be apparent from the foregoing that which a single adjustment of the viewing device, it may be moved from and into its operative position whenever it is desired without further adjustment of the device to focus upon the objective, and that the adjustment parts are arranged in such a manner that said position is accurately defined.

It will be understood the drawings and description are to be considered merely as illustrative of and not restrictive on the broader claims appended hereto, for various changes in design, structure and arrangement may be made without departing from the spirit and scope of said claims.

I claim:

1. In a camera having a body and a view finder adjustable with relation thereto, a bracket mounted on the body, said view finder being pivotally mounted on the bracket, a stop arm mounted stationarily with respect to said body, a member adjustable with relation to the view finder and capable of being set in relation thereto, and a stop associated with said member and adapted to engage the stop arm to fix said view finder in adjusted position and to limit the view finder to pivotal movement in one direction from its adjusted position.

2. In a camera having a body and a view finder adjustable with relation thereto, a supporting bracket mounted on the body, said view finder being pivotally mounted on the bracket, a stop arm mounted stationarily with respect to said body, an adjustment arm pivotally mounted on the supporting bracket and adjustable about its pivot with relation to a point on said view finder, and a stop mounted on the adjustment arm and adapted to engage said stop arm to limit said view finder to pivotal movement in one direction from its adjusted position.

3. In a camera having a body and a view finder adjustable with relation thereto, a bracket mounted on the body and a vertically adjustable bracket mounted on the first mentioned bracket, said view finder being pivotally mounted on the adjustable bracket, and adapted to swing horizontally about its pivot into and out of its operative position, a stop arm rigidly mounted on said adjustable bracket, an adjustment arm pivotally mounted on the adjustable bracket at the pivot point of the view finder and pivotally movable with relation to the view finder, an adjustment and clamp screw on the view finder and extending within a slot in the outer end of the adjustment arm and adjustable to set the relative position of the adjustment arm and said device, and a clamp screw stop mounted on the adjustment arm and adapted to engage and clamp said stop arm to hold the adjustment arm and the viewing device in adjusted position.

In witness that I claim the foregoing I have hereunto subscribed my name this 6th day of November, 1928.

GEORGE A. MITCHELL.